(12) United States Patent
Janssen et al.

(10) Patent No.: US 6,301,539 B1
(45) Date of Patent: Oct. 9, 2001

(54) METHOD FOR RECOGNIZING AND DAMPING WHEEL AND DRIVE TRAIN OSCILLATIONS

(75) Inventors: Gunner Janssen, Friedrichsdorf; Dieter Burkhard, Waldfischbach-Burgalben; Robert Schmidt, Rennerod; Thomas Bauer, Bullary, all of (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/367,339
(22) PCT Filed: Feb. 4, 1998
(86) PCT No.: PCT/EP98/00605
§ 371 Date: Dec. 2, 1999
§ 102(e) Date: Dec. 2, 1999
(87) PCT Pub. No.: WO98/35866
PCT Pub. Date: Aug. 20, 1998

(30) Foreign Application Priority Data

Feb. 17, 1997 (DE) .............................................. 197 05 947

(51) Int. Cl.⁷ ........................................................ B60T 8/00
(52) U.S. Cl. ................................ 701/70; 701/71; 303/194
(58) Field of Search ...................... 701/70, 71; 303/194, 303/195, 196, 176

(56) References Cited

U.S. PATENT DOCUMENTS 5,213,177 * 5/1993 May ..................................... 180/197
5,601,347 * 2/1997 Fischle et al. ...................... 303/191

FOREIGN PATENT DOCUMENTS

| 22 62 818 | 6/1993 | (DE) . |
| 44 23 577 | 8/1995 | (DE) . |
| 44 47 537 | 2/1996 | (DE) . |
| 195 12 623 | 10/1996 | (DE) . |
| 0 180 721 | 5/1986 | (EP) . |
| 04 21 065 | 4/1991 | (EP) . |
| 2 289 097 | 11/1995 | (GB) . |
| 90 06250 | 6/1990 | (WO) . |

* cited by examiner

Primary Examiner—Michael J. Zanelli
(74) Attorney, Agent, or Firm—Rader, Fishman & Grauer PLLC

(57) ABSTRACT

The speed variation of the driven wheels is analyzed in a method of recognizing critical drive train oscillations which require countermeasures during an (ABS) controlled brake maneuver. The occurrence of oscillations having a frequency typical of drive train oscillations is established. When oscillations with this frequency occur, the duration of the oscillating process is established on each individual wheel, or the number of the successive oscillations or semi-wave oscillations is counted. When a predetermined counter reading is reached, an oscillation recognition is indicated if, at that time, the vehicle acceleration is above a predetermined limit value and if oscillation recognition has not yet been triggered on the other driven wheel. To dampen the oscillations, switch-over to a special control is effected for a defined interval. The commencement of the special control prevents braking pressure reduction, the pressure is maintained constant, or at most a delayed pressure increase is allowed.

10 Claims, 3 Drawing Sheets

Ph2: pressure is reduced
Ph3: pressure is increased
Ph4: pressure is maintained constant

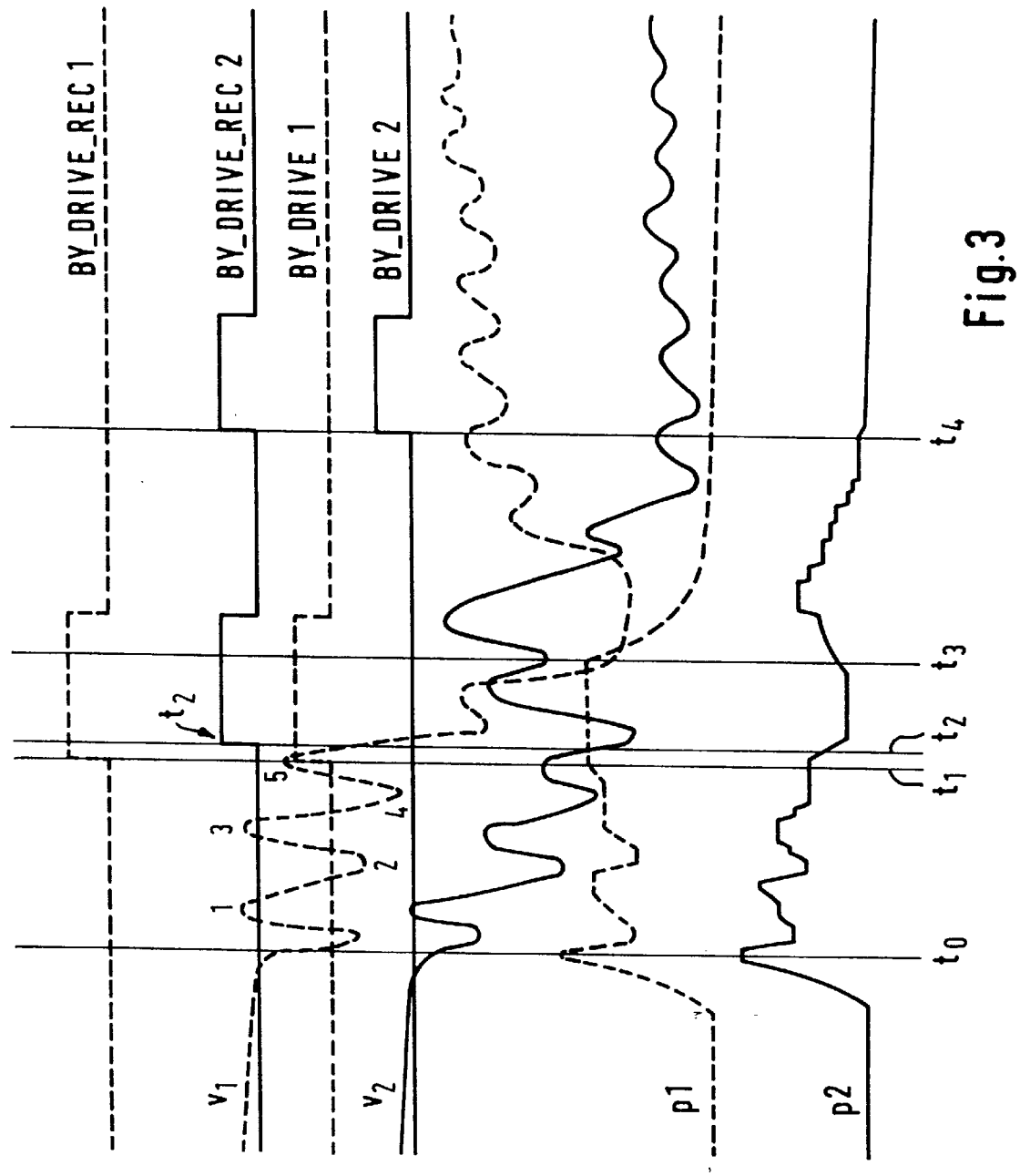

METHOD FOR RECOGNIZING AND DAMPING WHEEL AND DRIVE TRAIN OSCILLATIONS

TECHNICAL FIELD

The present invention relates to ABS control systems and more particularly relates to a method of recognizing critical drive train oscillations requiring countermeasures during an (ABS) controlled brake maneuver.

BACKGROUND OF THE INVENTION

International publication No. WO 90/06250 discloses an anti-lock control system which includes switching means to identify wheel and axle oscillations and intervening means to initiate measures for damping such oscillations. The rotational behavior of the wheels is measured by wheel sensors. In this publication, it is assessed as a criterion for oscillation recognition that the cycle times have approximately the same length when an oscillation prevails.

In a method disclosed in European patent application No. 0 262 602, the second time derivative of the speed of a drive wheel is compared to a reference value, and a signal indicative of drive train oscillations is emitted if the second time derivative exceeds the reference value.

Further, GB patent application No. 2 289 097 describes an anti-lock system wherein the rotational speed is determined on the differential from the speeds of the driven wheels and it is found out by filtering this signal whether an oscillation component which is in the frequency range of the drive train oscillations is superimposed on this rotational speed. Drive train oscillations prevail if two conditions are satisfied, i.e., if the oscillation frequency ranges between 5 and 12 hertz and the filtered signal exceeds a threshold value. A correction of braking pressure modulation which dampens the oscillations is performed.

An object of the present invention is to develop a reliable method which permits recognizing critical wheel or drive train oscillations that require countermeasures, i.e., damping measures, and avoiding unjustified control intervention. Another objective is to effectively damp the oscillations.

A signal is produced which can be evaluated as a basis for an effective damping of the drive train oscillations without jeopardizing the safety of the vehicle.

The present invention discloses a method wherein, upon the occurrence of oscillations with a frequency that lies within a critical range including the frequency range of typical drive train oscillations, the duration of the oscillating process on each individual wheel or the number of the successive oscillations or semi-wave oscillations is counted and, when a predetermined counter reading is reached, recognition of drive train oscillations is indicated if, at that time, the vehicle acceleration is above a predetermined limit value and if, at that time, oscillation recognition has not been triggered on the second wheel of the driven axle.

The special features of the method of the present invention for damping the oscillations include that when critical oscillations are recognized on a drive wheel selected according to predetermined criteria, the braking pressure control of this wheel is switched over for a defined interval to a special control which effects the oscillation damping operation.

Favorable embodiments of the method of the present invention are disclosed, for example, that the exceeding of a counter reading from 3 to 7, especially 4, successive semi-wave oscillations is set as a condition for the drive train oscillation recognition.

It has been found appropriate to predefine the limit value for the vehicle acceleration which must be exceeded for oscillation recognition by −0.6 g to −0.3 g or approximately −0.5 g. It is ensured thereby that the oscillation recognition according to the present invention occurs only in the range of low coefficients of friction.

In a preferred aspect of the method of damping the oscillations, the commencement of the special control prevents a braking pressure reduction on the wheel concerned, and a braking pressure increase induced by the control is allowed, if at all, delayed and/or with a flat or flattened gradient only. It may also be suitable to maintain the braking pressure at least roughly constant during the special control.

The special control will not be terminated until the brake slip of the wheel exceeds a predetermined high limit value in the order ranging between 40% and 60%, for example, 50%.

According to the present invention, wheel oscillations are assessed as critical which lie in a predetermined frequency range of e.g. between 5 hertz and 23 hertz typical of drive train oscillations, which occur at a vehicle acceleration that exceeds a limit value and which last longer than a predetermined period of time or number of oscillations.

It is an objective to react very quickly to wheel oscillations or drive train oscillations, however, an unjustified intervention must be avoided. In an embodiment, the minimum number of five successive semi-wave oscillations is assessed as a criterion for the change-over to the special control or the initiation of damping measures.

BRIEF DESCRIPTION OF THE DRAWINGS

FIG. 3 is a view of charts illustrating the variation of the wheel speeds and the braking pressures during an ABS-controlled braking operation when drive train oscillations occur and the initiation of damping measures.

DETAILED DESCRIPTION OF THE PREFERRED EMBODIMENTS

Figure 1:
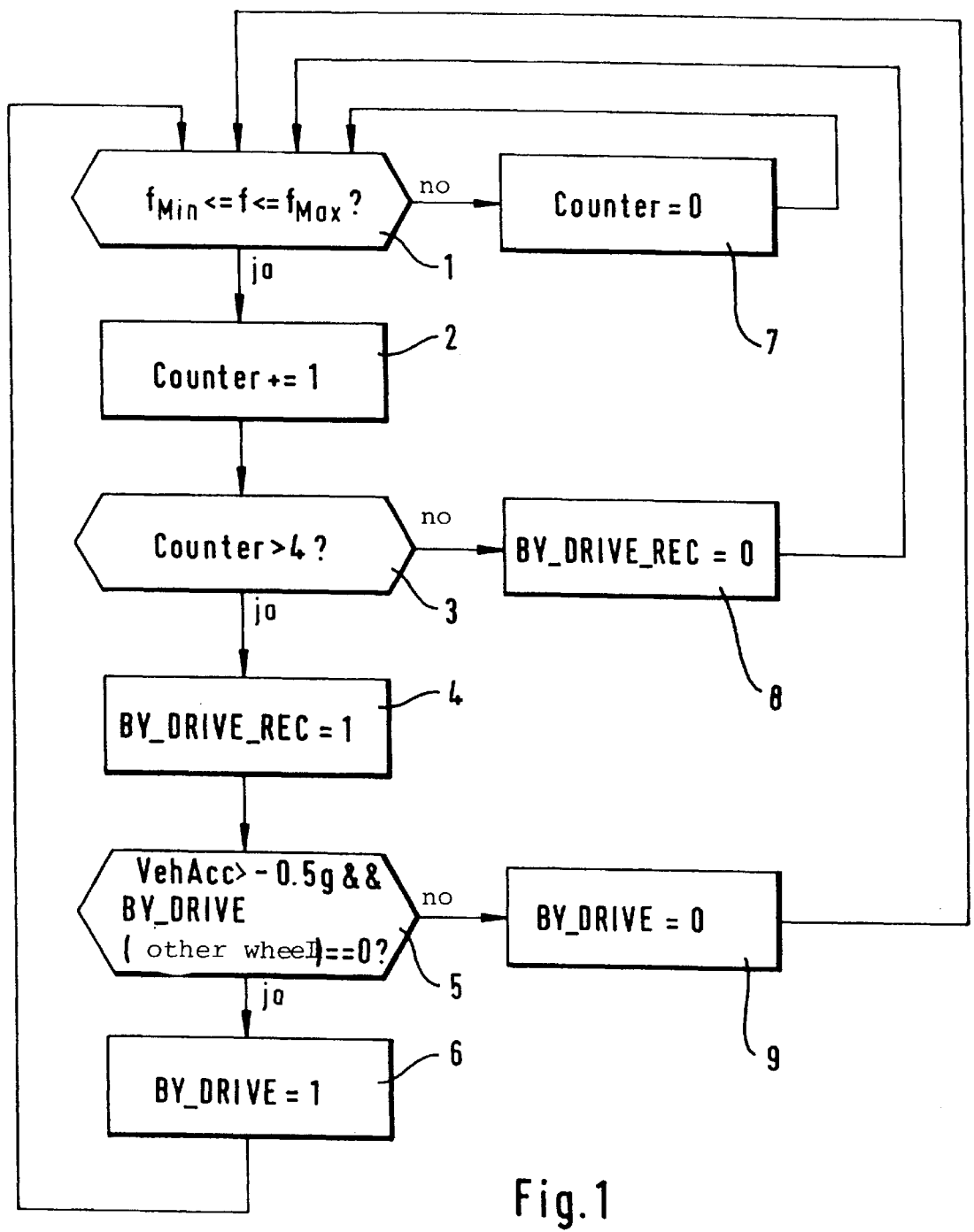
FIG. 1 is a flow chart for illustrating the oscillation recognition according to an embodiment of the present invention.

The flow chart in FIG. 1 which represents the individual steps and the basic sequence of decision in a simplified fashion illustrates the method of the present invention. To recognize wheel oscillations or drive train oscillations, it is first of all detected in a program step 1 or filter 1 whether the oscillation frequency f lies in a frequency range that is typical of drive train oscillations. A frequency range of $$f_{Min}=5 \text{ hertz to } f_{Max}=23 \text{ hertz}$$

is considered suitable. When the oscillations are in this range ('yes') and a defined minimum duration of the oscillating condition or a defined minimum number of oscillations is discovered, the next step in the flow chart to follow is in the direction of a damping measure. A counter 2 is provided in the embodiment shown which is incremented by the value '1' especially with every 'peak' (see FIG. 3) of the drive train oscillation and which reacts (step 3) as soon as the count value '4' is exceeded. When the counter reading '4' is exceeded, a recognition signal

BY_DRIVE_REC=1 is set in the flow chart according to FIG. 1, that is to say, a preceding stage of an oscillation recognition. This is done in program step 4.

The next step to make is to find out in step 5 whether the vehicle acceleration is above a predetermined minimum value of e.g. −0.5 g, i.e., VehAcc>−0.5 g, and whether the second condition BY_DRIVE(other wheel)=0?

is also satisfied. A relatively great vehicle acceleration (>−0.5 g) or, in other words, a deceleration below −0.5 g implies an information about the instantaneous road conditions or the coefficient of friction. The damping measure according to the present invention shall not be carried out at a great vehicle deceleration which is possible for physical reasons only under favorable road conditions.

The result of the second condition

BY_DRIVE(other wheel)=0 or the decision which depends on this condition is that the damping measure is always taken for only one of the two driven wheels (vehicles with one driven axle only are considered herein). This renders it possible to achieve relatively 'drastic' damping measures which lead to having to tolerate, for example, a very high brake slip for a short time. In one embodiment of a damping measure, the pressure reduction on the controlled wheel commences only when a relative slip of 50% is exceeded.

When the conditions checked in the decision step 5 are satisfied ('yes'), oscillation recognition, i.e., the recognition of drive train oscillations, is indicated, as represented in program step 6.

BY_DRIVE=1 applies for the respective drive wheel. A special control which effectively damps drive train oscillations is triggered for this wheel for a predetermined interval. The standard braking pressure control of the wheel will be modified for a defined interval. This will be explained in detail hereinbelow with reference to FIG. 3.

Thus, in the flow chart according to FIG. 1

BY_DRIVE_REC is the proper oscillation recognition signal or recognition bit. 'BY_DRIVE', however, can be interpreted as control signal or control bit. BY_DRIVE is set (i.e. BY_DRIVE=1) only if, as described hereinabove, the calculated vehicle deceleration is lower than −0.5 g and the control bit (BY_DRIVE) for the other drive wheel has not been set or has not yet been set, i.e.

BY_DRIVE other wheel=0.

The control signal BY_DRIVE is consequently set only for braking operations on road surfaces with a low to medium coefficient of friction and only for one of the two drive wheels. As soon as the vehicle deceleration becomes greater than the predetermined limit value (greater than −0.5 in the present example), when the oscillations have subsided or left the frequency range>$f_{Min}$;<$f_{Max}$ so that 'BY_DRIVE_REC' changes from 1 to 0, the oscillation recognition and, thus, the damping measure triggered by the oscillation recognition on the wheel concerned will end.

'BY_DRIVE' serves, for example, as a control bit for the change-over or modification of the pressure modulation on the drive wheels.

Program steps 7, 8, and 9 in FIG. 1 represent the resetting of the counter when the frequency is beyond the predetermined critical range, the status of the recognition signal (BY_DRIVE_REC=0) at a too low counter reading and the non-fulfillment of the AND—condition 5.

Driving tests have shown that disturbing drive train oscillations can be suppressed effectively and quickly by the oscillation recognition described above and by corresponding damping measures. With a recognition band width of 5 hertz to 23 hertz and a reaction after five semi-wave oscillations (counter reading>4 according to program step 3 in FIG. 1), drive train oscillations are recognized after approximately 250 msec in practical operations. Due to the above-mentioned drastic damping measures, it will take about 700 to 800 msec in practical operations from the point of time the oscillations commence until the oscillations fade away.

Figure 2A:
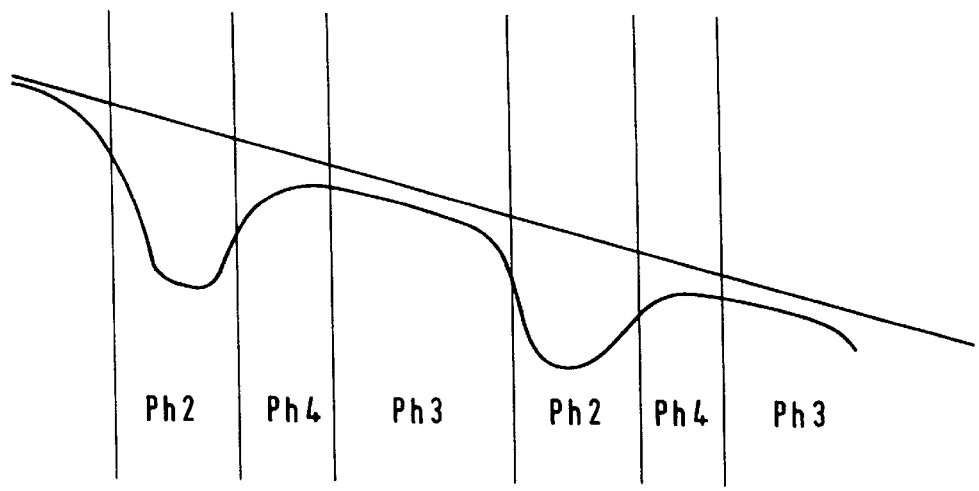
FIG. 2a is a chart showing a typical wheel speed variation during an ABS-controlled braking maneuver.

FIG. 2a depicts the speed variation of a wheel during a normal controlled braking operation. When making a distinction between the control operation and the control reaction, as indicated in FIG. 2a, in consecutive phases Ph2, Ph4, Ph3, pressure reduction takes place in phase Ph2, pressure increase takes place in phase Ph3, and in phase Ph4 the pressure is generally maintained constant. Under certain circumstances, premature pressure increase occurs.

Figure 2B:
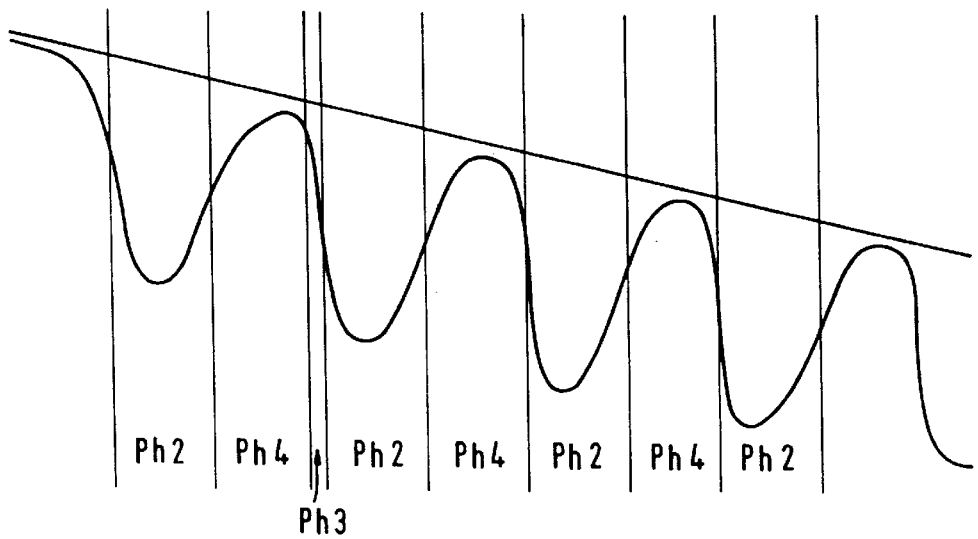
FIG. 2b is a view, similar to FIG. 2a, of the wheel speed variation upon the occurrence of drive train oscillations.

When drive train oscillations occur during the ABS-controlled brake maneuver, this leads to the course of wheel speed shown in FIG. 2b. A quick change in pressure-reduction phases and pressure-increase phases will occur without damping measures, and the control frequency becomes high. The result is reduced comfort, disturbing noise, increased wear and, possibly, control operations which are critical in terms of safety.

In the record of FIG. 3, the speed variation $v_1, v_2$ of the two drive wheels of a vehicle in a braking phase afflicted by drive train oscillations is represented as a part of an ABS-controlled brake maneuver. Besides, the recognition and control signals

BY_DRIVE_REC 1,2

(i.e., on wheel '1', wheel '2') and

BY_DRIVE 1,2 are shown. The solid characteristic curves refer to the drive wheel 1, the dotted lines to the drive wheel 2.

The speed variation of the two wheels and the braking pressure $p1, p2$ in the associated wheel brakes are shown.

The drive wheels with the wheel speeds $v_1$, $v_2$ are set into oscillations at the time $t_0$ after the commencement of anti-lock control. The oscillation frequency f (see FIG. 1) lies in the range typical of drive train oscillations and in the frequency range set by the filter 1. The oscillation half waves are counted by counter 2. The counter reading reaches the value '5' at time $t_1$, thus, exceeds the limit value '4' at this time $t_1$ and thereby triggers a recognition signal BY_DRIVE_REC 1 (see uppermost characteristic curve in FIG. 3). At this time $t_1$, the vehicle acceleration is above −0.5 (not shown in FIG. 3). Further, the signal BY_DRIVE 2, that is the control bit of the 'other' wheel, has not yet been set at the time $t_1$ so that now a recognition or control signal

BY DRIVE 1=1 for this drive wheel 1 is emitted and a damping measure is thereby triggered on this wheel. As can be taken from the course of the braking pressure p1 on the drive wheel 1, the braking pressure is kept constant following $t_1$ although the major deceleration or the rising slip on wheel 1 would have to result in a pressure reduction in a 'normal' braking pressure control operation.

The slip on the drive wheel 1 will finally reach a defined limit value, for example, a relative slip value of 50%, at time $t_3$, so that now a reduction of the braking pressure p1 induced by the control is carried out irrespective of the oscillation recognition signals. As can be seen in the speed curve $v_1$, this pressure reduction very soon will lead to a recovery of wheel 1 and an approach of the wheel speed $v_1$ to the (non-illustrated) vehicle speed.

The second drive wheel with the speed $v_2$ will also start to oscillate in about commencing time $t_0$. In the example shown, however, this is not 'recognized', or does not lead to damping measures on wheel 2, because initially, i.e., at time $t_1$, oscillation recognition occurs on wheel 1. This is illustrated by the short difference in time between $t_1$ and $t_2$ which takes effect on a corresponding delay of the signal BY_DRIVE_REC 2 with respect to the signal BY_DRIVE_REC 1. Limiting the damping measures to a defined drive wheel renders it possible to provide a radical, 'drastic' damping measure which makes the drive train oscillations fade away in a very short time. A comparison of the braking pressure variation p1 on wheel 1 which undergoes special control with the pressure p2 on the drive wheel 2 which is controlled normally, clearly shows these differences. An effective damping is achieved by maintaining the braking pressure constant in the interval from $t_1$ to $t_3$, as described hereinabove, and by tolerating a very high brake slip. In contrast thereto, the reduction of the braking pressure p2 on the wheel 2 commences as a consequence of the wheel course $v_2$ already before time $t_2$.

The recognition signals subsequent to $t_4$ will not cause any further damping measures in the example of a braking operation shown in FIG. 3 because, obviously, the braking pressure has already been reduced to a large degree or the controlled braking operation has almost been terminated. The amplitudes of the superposed oscillations following $t_4$ are relatively small.

Thus, FIG. 3 shows an embodiment of an effective measure for damping oscillations as a consequence of the drive train oscillation recognition according to the present invention which also comprises the selection or recognition of any one of the two wheels according to predetermined criteria and, thus, the preparation for the damping measure. Because the wheel oscillations are induced by drive train oscillations, such oscillations naturally occur on both drive wheels, even though maybe with different intensity and phase position.

The selection of the recognition band width from 5 hertz to 23 hertz, realized by filter 1 according to FIG. 1, and the counting of at least five consecutive semi-wave oscillations as a condition for the oscillation recognition result in a safe reaction to oscillations, on the one hand, and a quick recognition and, thus, triggering of countermeasures or damping measures, on the other hand. In practical operations, drive train oscillations are recognized this way after 250 msec at the latest and can be dampened effectively in a subsequent period of time of 400 msec to 600 msec.

Drive train oscillations occur above all in controlled braking operations in the engaged condition on defined road surfaces with a low coefficient of friction. They are most potential on so-called peak ice, that is, on road conditions where the coefficient of friction is at its maximum only within a relatively narrow slip range and decreases quickly outside this range.

An analysis showed that the pressure modulation which is the result of a controlled braking operation in the worst case boosts the tendency of the drive wheels to oscillations because pressure is reduced exactly when the wheel is in the reacceleration phase and, on the other hand, pressure is increased exactly when the wheel becomes subjected to slip. To counteract this behavior, the method of the present invention was developed which has for its object the early recognition of drive train oscillations and the determination of a drive wheel where the damping measure is taken.

The general objective of the countermeasures is to prevent that oscillations are induced and, when oscillations are recognized, to control that pressure is reduced, pressure is increased and maintained constant so that an oscillating wheel is actively damped.

To avoid the inducement of oscillations, a premature pressure increase which is, under certain conditions, suitable already in the actual pressure maintaining phase is prevented when pressure reduction and increase operations directly follow each other.

If the drive train is set to oscillate nevertheless, or if the oscillations continue, further measures will come into effect.

A stop of pressure reduction has proved to be the most effective measure where the pressure level in the wheel brake cylinder of one of the two oscillating wheels is maintained until maximally 50% of relative wheel slip is reached. This leads to the wheel becoming subjected to major slip, with the oscillation fading significantly. The oscillation damping operation is transmitted via the differential also to the second drive wheel of the axle for which the pressure stop does not apply.

When a relative wheel slip of more than 50% is reached, a pulsed pressure reduction renders it possible for the wheel to reaccelerate. The engine is prevented from stalling by this fact and by the fact that this measure is employed on one wheel only.

What is claimed is:

1. Method of recognizing drive train oscillations, on vehicles having at least one front pair or one rear pair of wheels and wherein at least one wheel in said at least one front pair or rear pair of wheels is a driven wheel comprising the steps of:

analyzing the speed variation of at least one of the driven wheels, establishing the occurrence of oscillations having a frequency typical of drive train oscillations, determining the occurrence of oscillations with a frequency that lies within a predetermined critical range using at least one of the frequency range of typical drive train oscillations, the duration of the oscillating condition on each wheel is established, or the number of the successive oscillations or semi-wave oscillations is counted, and determining the reaching of a minimum duration of the oscillating condition or a predetermined counter reading, recognizing that drive train oscillations are present if, simultaneously, the vehicle acceleration is above a predetermined limit value and if oscillation recognition has not been triggered on the second wheel of the same pair of wheels.

2. Method as claimed in claim 1, wherein a range between 5 hertz and 23 hertz, is predefined as being critical.

3. Method as claimed in claim 1, wherein the reaching of a counter reading of 4 to 8 successive semi-wave oscillations is preset as a condition for recognizing the presence of oscillation.

4. Method as claimed in claim 1, wherein a vehicle acceleration which is greater than −0.6 g to −0.3 g, is preset as a condition for recognizing the presence of oscillation.

5. Method as claimed in claim 1, further including the step of switching braking pressure control of one or more vehicle wheels to a special control for a defined interval.

6. Method as claimed in claim 5, further including the step of preventing braking pressure reduction, and allowing a braking pressure increase induced by the control wherein said allowed braking pressure increase is delayed or controlled using a flat gradient.

7. Method as claimed in claim 5, further including the step of maintaining the braking pressure generally constant during the special control.

8. Method as claimed in claim 5, further including the step of terminating the special control as soon as a brake slip of the wheel exceeds a predetermined limit value.

9. Method as claimed in claim 1, further including the steps of assessing wheel oscillations as critical which lie in a predefined frequency range typical of drive train oscillations, which occur at a vehicle acceleration that exceeds a limit value, and which last longer than a predetermined interval or number of oscillations.

10. Method as claimed in claim 1, wherein a vehicle acceleration greater than −0.5 g is preset as a condition for recognizing the presence of oscillation.

* * * * *